US011978605B2

(12) United States Patent
Kawaguchi et al.

(10) Patent No.: US 11,978,605 B2
(45) Date of Patent: May 7, 2024

(54) ELECTROMAGNETIC RELAY

(71) Applicant: OMRON Corporation, Kyoto (JP)

(72) Inventors: Naoki Kawaguchi, Kyoto (JP); Takeshi Nishida, Kyoto (JP); Kazuki Furukawa, Kyoto (JP); Takashi Tsukada, Kyoto (JP)

(73) Assignee: OMRON CORPORATION, Kyoto (JP)

( * ) Notice: Subject to any disclaimer, the term of this patent is extended or adjusted under 35 U.S.C. 154(b) by 0 days.

(21) Appl. No.: 17/835,883

(22) Filed: Jun. 8, 2022

(65) Prior Publication Data

US 2022/0406546 A1 Dec. 22, 2022

(30) Foreign Application Priority Data

Jun. 17, 2021 (JP) ................................ 2021-101219

(51) Int. Cl.
*H01H 50/38* (2006.01)
*H01H 50/02* (2006.01)
*H01H 50/14* (2006.01)

(52) U.S. Cl.
CPC ............ *H01H 50/38* (2013.01); *H01H 50/02* (2013.01); *H01H 50/14* (2013.01)

(58) Field of Classification Search
CPC ...... H01H 50/60; H01H 50/14; H01H 50/163; H01H 50/58; H01H 2205/002; H01H 9/302; H01H 9/34; H01H 50/023; H01H 50/54; H01H 50/38; H01H 50/02; H01H 50/00; H01H 9/30; H01H 9/44
USPC .......................................................... 335/185
See application file for complete search history.

(56) References Cited

U.S. PATENT DOCUMENTS 4,421,959 A * 12/1983 Chen ........................ H01H 9/38 200/243
5,546,061 A * 8/1996 Okabayashi ........... H01H 9/443 335/126
6,700,466 B1 * 3/2004 Yamamoto ............. H01H 9/302 335/201
6,975,194 B2 * 12/2005 Nishida .............. H01H 51/2209 335/201

(Continued)

FOREIGN PATENT DOCUMENTS

JP 2016-24864 A 2/2016

*Primary Examiner* — Shawki S Ismail
*Assistant Examiner* — Lisa N Homza
(74) *Attorney, Agent, or Firm* — SHINJYU GLOBAL IP

(57) ABSTRACT

An electromagnetic relay includes a first fixed terminal, a second fixed terminal, a movable contact piece, a case, a magnet, and a gas flow path. The first fixed terminal includes a first fixed contact. The second fixed terminal includes a second fixed contact. The movable contact piece includes a first movable contact and a second movable contact. The case includes an accommodation space where the first fixed contact, the second fixed contact, and the movable contact piece are accommodated, a gas inflow space separate from the accommodation space, and a side wall covering the accommodation space and the gas inflow space in a first direction. The magnet is disposed between the accommodation space and the gas inflow space. The gas flow path is disposed between the side wall of the case and the magnet and is configured to communicate the accommodation space with the gas inflow space.

11 Claims, 5 Drawing Sheets

(56) References Cited

U.S. PATENT DOCUMENTS

| | | | | |
|---|---|---|---|---|
| 8,519,811 | B2 * | 8/2013 | Sugisawa | H01H 1/54<br>335/201 |
| 2010/0060394 | A1 * | 3/2010 | Nagura | H01H 9/443<br>335/189 |
| 2012/0313737 | A1 * | 12/2012 | Iwamoto | H01H 50/56<br>335/185 |
| 2018/0182584 | A1 * | 6/2018 | Iwamoto | H01H 50/18 |
| 2019/0035585 | A1 * | 1/2019 | Minowa | H01H 50/546 |

* cited by examiner

ELECTROMAGNETIC RELAY

This application claims priority to Japanese Patent Application No. 2021-101219, filed Jun. 17, 2021. The contents of that application are incorporated by reference herein in their entirety.

FIELD

The present invention relates to an electromagnetic relay.

BACKGROUND

In an electromagnetic relay, an arc occurs at the contacts when the current is cut off. As the arc elevates the temperature of the contacts, the contacts may melt and generate a hot gas containing metal vapor. If the hot gas stays in the vicinity of the contacts, the insulation performance between the contacts is degraded, and the arc may reignite. In order to prevent the re-ignition of the arc, the electromagnetic relay disclosed in Japanese Unexamined Patent Application Publication No. 2016-24864 includes an arc-extinguishing space, a gas inflow space separate from the arc-extinguishing space, and a gas passage, all disposed in a case, for allowing the hot gas to escape from the arc-extinguishing space into the gas inflow space.

SUMMARY

In the electromagnetic relay of Japanese Unexamined Patent Application Publication No. 2016-24864, the inlet and outlet of the gas passage are disposed in the vicinity of the contact. Thus, the hot gas easily returns to the contact through the gas passage. As the load capacity increases, the amount of hot gas returning to the vicinity of the contact also increases, which may cause the arc to reignite.

An object of the present invention is to reduce the possibility of re-ignition of an arc at a contact in an electromagnetic relay.

The electromagnetic relay according to one aspect of the present invention includes a first fixed terminal, a second fixed terminal, a movable contact piece, a case, a magnet, and a gas flow path. The first fixed terminal includes a first fixed contact. The second fixed terminal includes a second fixed contact and is disposed apart from the first fixed terminal. The movable contact piece includes a first movable contact facing the first fixed contact and a second movable contact facing the second fixed contact. The case includes an accommodation space where the first fixed contact, the second fixed contact, and the movable contact piece are accommodated, a gas inflow space separate from the accommodation space, and a side wall covering the accommodation space and the gas inflow space in a first direction. The magnet is disposed between the accommodation space and the gas inflow space and is configured to extend the arc generated between the first fixed contact and the first movable contact. The gas flow path is disposed between the side wall of the case and the magnet and is configured to communicate the accommodation space with the gas inflow space.

In the electromagnetic relay, a gas flow path configured to communicate the accommodation space with the gas inflow space is disposed between the side wall of the case and the magnet. As such, the hot gas due to the arc between the first fixed contact and the first movable contact can escape from the accommodation space to the gas inflow space. Also, since the magnet is disposed between the accommodation space and the gas inflow space, the gas inflow space resides behind the magnet. Thus, the hot gas is unlikely to return from the gas inflow space to the vicinity of the contact. Accordingly, the possibility can be reduced that the arc generated between the first fixed contact and the first movable contact is re-ignited.

The magnet may extend the arc in the first direction. In this case, since the arc is extended in the direction toward the gas flow path, the hot gas due to the arc can be quickly released from the accommodation space to the gas inflow space.

The case may further include a magnet housing disposed apart from the side wall in a second direction opposite to the first direction. The gas flow path may be disposed between the side wall of the case and the magnet housing. In this case, the magnet in the magnet housing is less likely to be affected by the arc on the magnet.

The electromagnetic relay may further include a support member configured to support the magnet. The gas flow path may be disposed in the support member. In this case, the magnet can be supported by the support member, and the support member can also serve as the gas flow path.

The magnet housing may include an arc contact surface where the arc contacts, and may be a separate body from the side wall of the case. In this case, the magnet housing can be comprised of a material having better arc extinguishing performance than that of the side wall of the case, and thereby the arc can be extinguished quickly by the arc contact surface.

The magnet housing may be integrated with the support member. In this case, the magnet housing and the support member can be comprised of a material having excellent arc extinguishing performance.

The magnet may be inserted into the magnet housing in the first direction. In this case, the magnet can be easily assembled.

The magnet housing may include an inlet opened in the first direction. The side wall of the case may include a through hole penetrating the side wall in the first direction. The magnet may be housed in the magnet housing via the inlet and the through hole. The support member may include a first cover portion configured to cover the inlet and a second cover portion configured to cover the through hole. The gas flow path may be disposed between the first cover portion and the second cover portion. In this case, the support member can reduce the effects of the arc on the magnet, and also serve as the gas flow path.

The magnet housing may partition the accommodation space from the gas inflow space. In this case, the space inside the case can be used efficiently, downsizing the electromagnetic relay.

The magnet housing may extend in the second direction beyond the first fixed contact with respect to the side wall of the case. In this case, the hot gas is more unlikely to return from the gas inflow space to the vicinity of the contact.

The electromagnetic relay may further include a drive device including a coil configured to move the movable contact piece. The gas inflow space may be in communication with a space where the drive device is installed. In this case, the hot gas is more unlikely to return from the gas inflow space to the vicinity of the contact.

DETAILED DESCRIPTION

Figure 1:
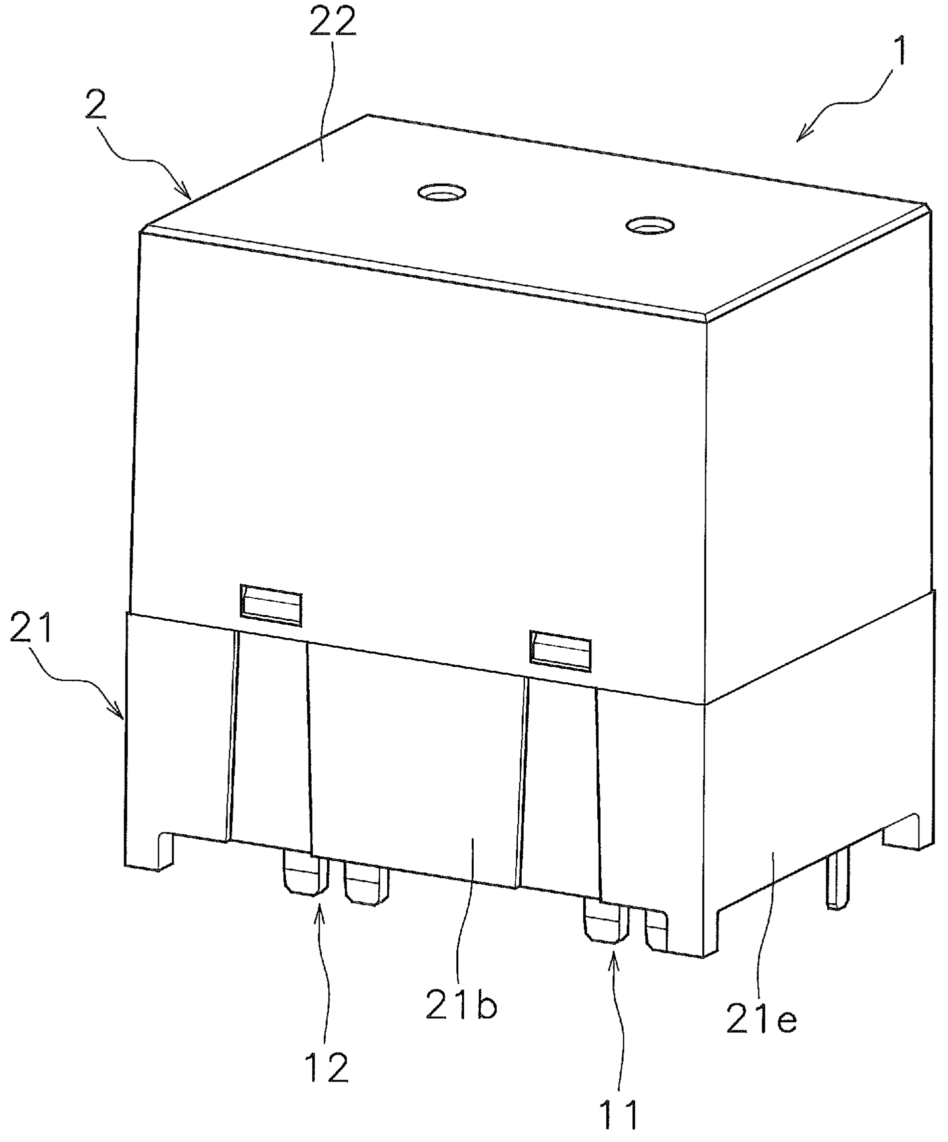
FIG. 1 is a perspective view of an electromagnetic relay.
Figure 2:
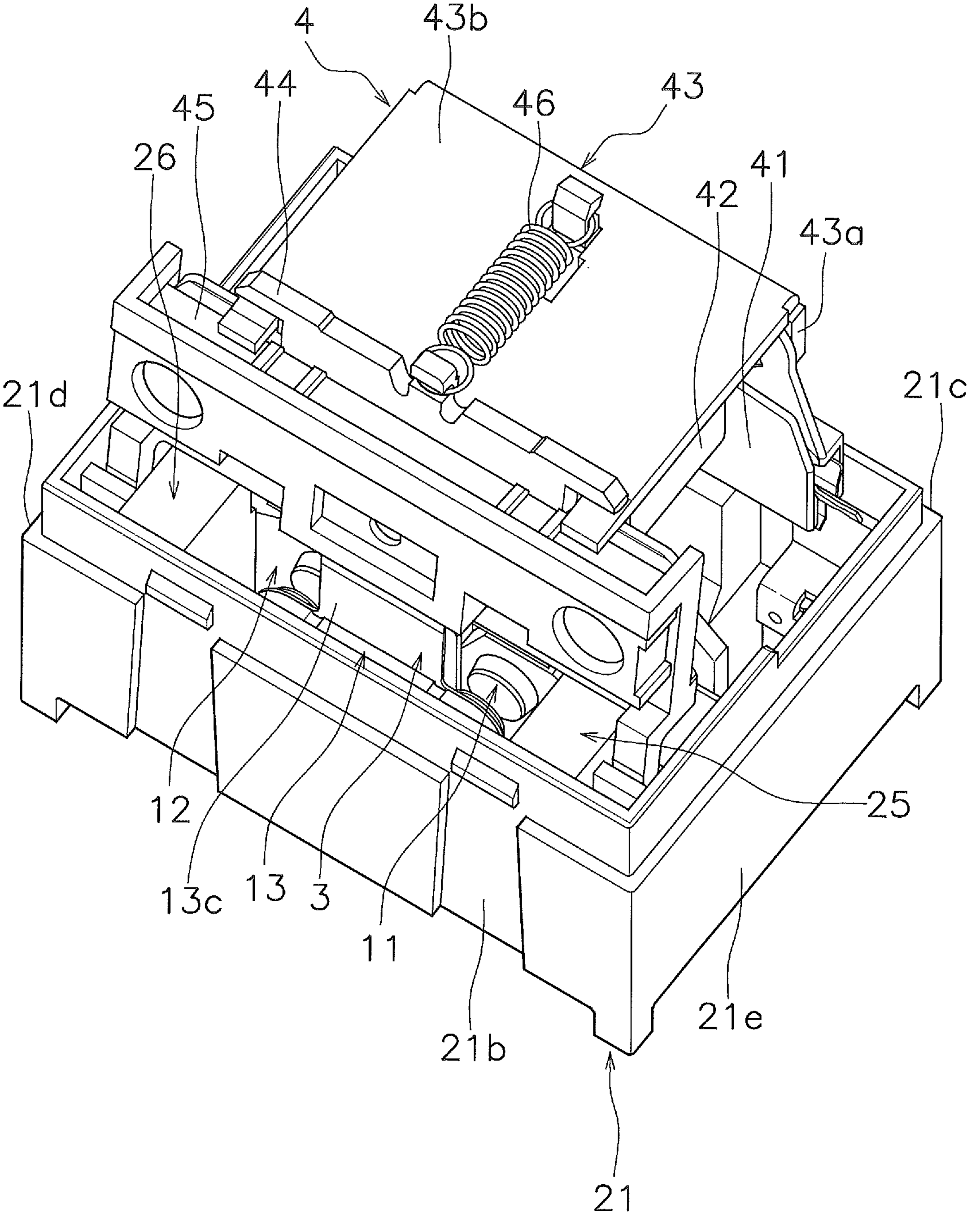
FIG. 2 is a perspective view of an electromagnetic relay with the cover removed.

Hereinafter, an electromagnetic relay 1 according to an embodiment will be described with reference to the drawings. As shown in FIGS. 1 and 2, the electromagnetic relay 1 includes a case 2, a contact device 3, and a drive device 4.

Figure 3:
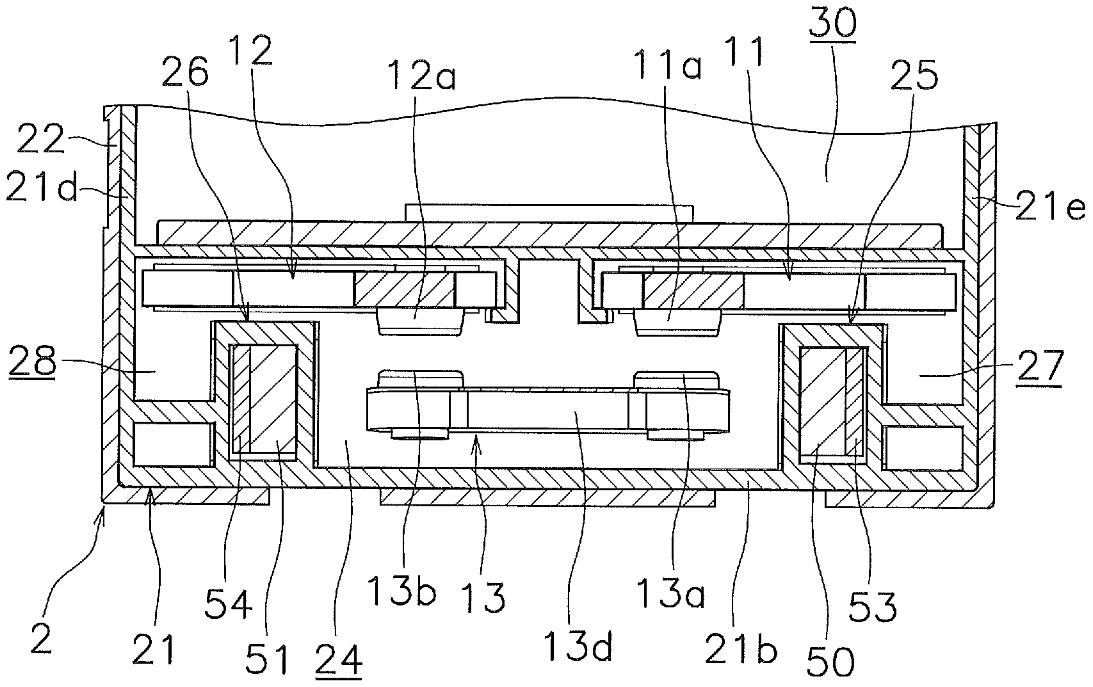
FIG. 3 is a partial cross-sectional view of an electromagnetic relay cut along a plane orthogonal to the up-down direction.

In the following description, the direction in which the contact device 3 and the drive device 4 are disposed with respect to a later-described base 21 of the case 2 is referred to as up (an example of a second direction), and the opposite direction is referred to as down (an example of a first direction). The direction in which the contact device 3 is disposed with respect to the drive device 4 is referred to as front, and the opposite is referred to as back. The left-right direction of the paper of FIG. 3 is referred to as left-right. However, these directions are defined only for convenience of description, and do not limit the arrangement directions of the electromagnetic relay 1.

The case 2 has a box shape. The case 2 is made of an insulating material such as resin. The case 2 includes a base 21 and a cover 22. The base 21 supports the contact device 3 and the drive device 4. The base 21 includes a bottom 21*a* and outer walls 21*b* to 21*e*. The bottom 21*a* extends in a direction orthogonal to the up-down direction. The outer wall 21*b* extends upward from the front edge of the bottom 21*a*. The outer wall 21*c* extends upward from the back edge of the bottom 21*a*. The outer wall 21*d* extends upward from the left edge of the bottom 21*a*. The outer wall 21*e* extends upward from the right edge of the bottom 21*a*. The cover 22 is open downward and is attached to the outer walls 21*b* to 21*e* of the base 21 so as to cover the bottom 21*a* of the base 21 from above. The contact device 3 and the drive device 4 are accommodated in the case 2.

As shown in FIG. 3, the contact device 3 includes a first fixed terminal 11, a second fixed terminal 12, and a movable contact piece 13. In the following description, the first fixed terminal 11 and the second fixed terminal 12 may be referred to as fixed terminals 11 and 12.

The fixed terminals 11 and 12 are made of a conductive material such as copper. The fixed terminals 11 and 12 are plate-shaped terminals and extend in a direction orthogonal to the front-back direction. The fixed terminals 11 and 12 are supported by the bottom 21*a* of the base 21. In the present embodiment, the fixed terminals 11 and 12 are fixedly press-fitted to the bottom 21*a* of the base 21.

Figure 4:
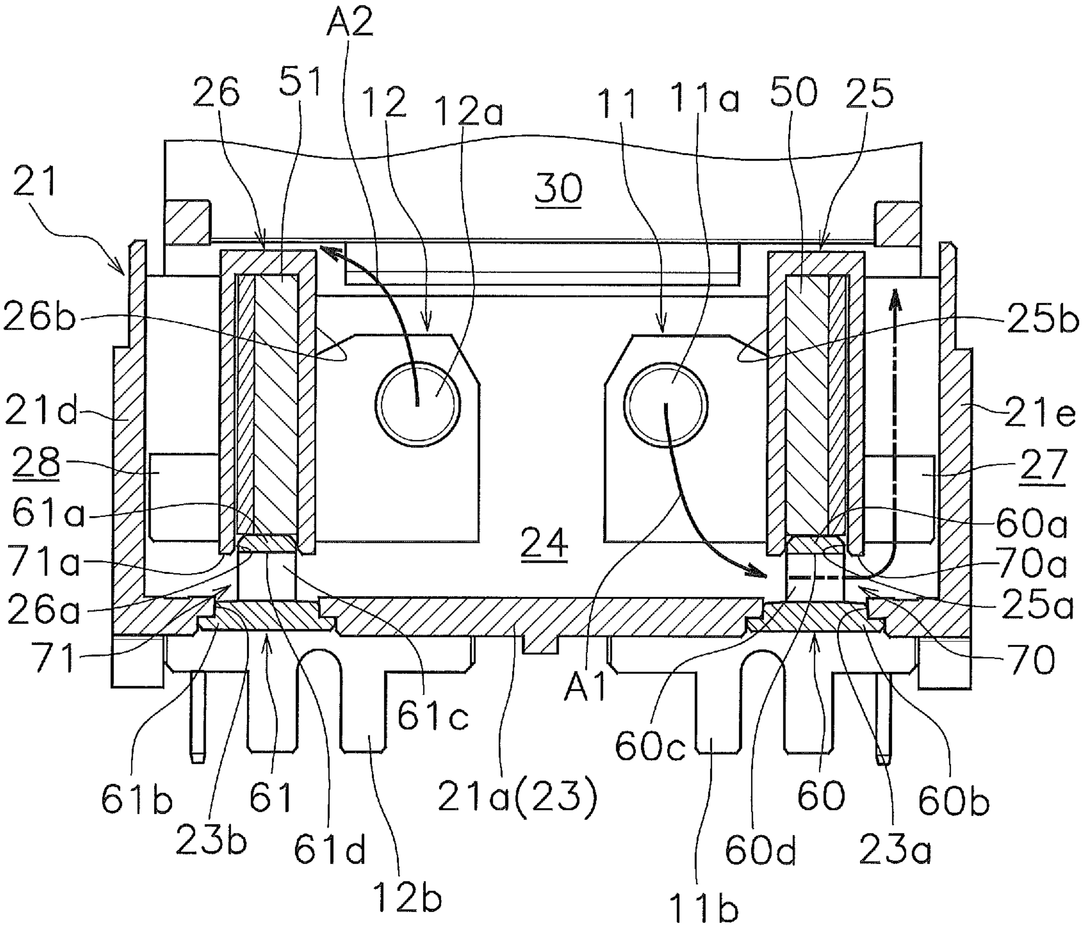
FIG. 4 is a partial cross-sectional view of an electromagnetic relay cut along a plane orthogonal to the front-back direction.

As shown in FIGS. 3 and 4, the first fixed terminal 11 includes a first fixed contact 11*a* and a first external connecting portion 11*b*. The first fixed contact 11*a* is disposed on the front surface of the first fixed terminal 11. The first fixed contact 11*a* is fixedly caulked to the first fixed terminal 11. Note that the first fixed contact 11*a* may be integrated with the first fixed terminal 11. The first external connecting portion 11*b* protrudes downward from the bottom 21*a* of the base 21 and is electrically connected to an external device (not shown).

The second fixed terminal 12 is disposed apart from the first fixed terminal 11 to the left. The second fixed terminal 12 has a symmetrical shape with respect to the first fixed terminal 11. The second fixed terminal 12 includes a second fixed contact 12*a* and a second external connecting portion 12*b*. The second fixed contact 12*a* is disposed on the front surface of the second fixed terminal 12. The second fixed contact 12*a* is fixedly caulked to the second fixed terminal 12. Note that the second fixed contact 12*a* may be integrated with the second fixed terminal 12. The second external connecting portion 12*b* protrudes downward from the bottom 21*a* of the base 21 and is electrically connected to an external device (not shown).

The movable contact piece 13 is a plate-shaped terminal and is made of a conductive material such as copper. The movable contact piece 13 is disposed in front of the fixed terminals 11 and 12. The movable contact piece 13 has a substantially T-shape when viewed from the front-back direction. The movable contact piece 13 includes a first movable contact 13*a*, a second movable contact 13*b*, an up-down extending portion 13*c*, and a left-right extending portion 13*d*.

The first movable contact 13*a* and the second movable contact 13*b* are fixedly caulked to the movable contact piece 13. The first movable contact 13*a* and the second movable contact 13*b* are disposed on the back surface of the left-right extending portion 13*d*. The first movable contact 13*a* faces the first fixed contact 11*a* in the front-back direction. The first movable contact 13*a* is able to be in contact with the first fixed contact 11*a*. The second movable contact 13*b* is disposed apart from the first movable contact 13*a* to the left. The second movable contact 13*b* faces the second fixed contact 12*a* in the front-back direction. The second movable contact 13*b* is able to be in contact with the second fixed contact 12*a*. The first movable contact 13*a* and the second movable contact 13*b* may be integrated with the movable contact piece 13.

The up-down extending portion 13*c* extends in the up-down direction and is connected to the drive device 4. The left-right extending portion 13*d* extends in the left-right direction from the lower part of the up-down extending portion 13*c*.

The drive device 4 is disposed above the contact device 3. The drive device 4 moves the movable contact piece 13 in the direction in which the first movable contact 13*a* approaches the first fixed contact 11*a* and in the direction in which the first movable contact 13*a* separates from the first fixed contact 11*a*. Further, the drive device 4 moves the movable contact piece 13 in the direction in which the second movable contact 13*b* approaches the second fixed contact 12*a* and in the direction in which the second movable contact 13*b* separates from the second fixed contact 12*a*. In the present embodiment, the drive device 4 moves the movable contact piece 13 in the front-back direction.

The drive device 4 includes a spool 41, a coil 42, a yoke 43, a movable iron piece 44, a resin member 45, a return spring 46, and a fixed iron core (not shown). The spool 41 is cylindrical and extends in the front-back direction. The coil 42 is wound around the outer circumference of the spool 41. The yoke 43 has an L-shaped bent shape. The yoke 43 includes a coupling portion 43*a* and an extending portion 43*b*. The coupling portion 43*a* is disposed behind the spool 41 and is coupled to the fixed iron core. The extending portion 43*b* extends forward from the upper end of the coupling portion 43*a* to cover the upper part of the coil 42.

The movable iron piece 44 is in front of the fixed iron core. The movable iron piece 44 is rotatably supported by the yoke 43 at the front end of the extending portion 43*b*. The resin member 45 insulates the movable iron piece 44 and the movable contact piece 13. The resin member 45 couples the movable iron piece 44 and the movable contact piece 13. Specifically, the movable iron piece 44 and the movable contact piece 13 are made by insert-molding into the resin member 45. Thus, the resin member 45 and the movable contact piece 13 are rotatable integrally with the movable iron piece 44 in response to the rotation of the movable iron piece 44.

The return spring 46 is a coil spring and extends in the front-back direction. The return spring 46 has a front end connected to the movable iron piece 44 and a back end connected to the yoke 43. The return spring 46 forces the movable contact piece 13 forward via the movable iron piece 44 and the resin member 45. That is, the return spring 46 forces the movable contact piece 13 in the direction in which the first movable contact 13*a* separates from the first fixed contact 11*a* and in the direction in which the second movable contact 13*b* separates from the second fixed contact 12*a*. The fixed iron core is disposed inside the spool 41 and penetrates the spool 41 in the front-back direction.

Next, the operation of the electromagnetic relay 1 will be described. While no voltage is applied to the coil 42, as shown in FIG. 3, by the elastic force of the return spring 46, the first movable contact 13*a* is separated from the first fixed contact 11*a* and the second movable contact 13*b* is separated from the second fixed contact 12*a*. When a voltage is applied to the coil 42 and the coil 42 is excited, the electromagnetic force causes the movable iron piece 44 to be attracted to the fixed iron core, which rotates the movable iron piece 44 against the elastic force of the return spring 46. Consequently, the movable contact piece 13 moves backward, the first movable contact 13*a* contacts the first fixed contact 11*a*, and the second movable contact 13*b* contacts the second fixed contact 12*a*. When the application of the voltage to the coil 42 is stopped, the movable iron piece 44 is rotated by the elastic force of the return spring 46. As a result, the movable contact piece 13 moves forward, the first movable contact 13*a* separates from the first fixed contact 11*a*, and the second movable contact 13*b* separates from the second fixed contact 12*a*.

Here, the case 2 further includes a side wall 23, an accommodation space 24, magnet housings 25, 26, and gas inflow spaces 27, 28. The side wall 23 is configured by the bottom 21*a* of the base 21 in the present embodiment. The side wall 23 covers the accommodation space 24 and the gas inflow spaces 27 and 28 from below. The side wall 23 has through holes 23*a* and 23*b*. The through holes 23*a* and 23*b* penetrate the side wall 23 in the up-down direction. The through hole 23*a* is disposed below the magnet housing 25. The through hole 23*b* is disposed below the magnet housing 26.

The accommodation space 24 is disposed between the base 21 and the cover 22. The accommodation space 24 is between the magnet housing 25 and the magnet housing 26 in the left-right direction. The first fixed contact 11*a*, the second fixed contact 12*a*, and the movable contact piece 13 are accommodated in the accommodation space 24.

The magnet housing 25 is integrally formed with the base 21. The magnet housing 25 extends in the up-down direction and backward from the outer wall 21*b* of the base 21. The magnet housing 25 is disposed upwardly apart from the bottom 21*a* of the base 21. The magnet housing 25 is disposed to the right of the first fixed contact 11*a* and the first movable contact 13*a*. The magnet housing 25 is disposed between the accommodation space 24 and the gas inflow space 27. The magnet housing 25 partitions the accommodation space 24 and the gas inflow space 27 in the left-right direction. The magnet housing 25 extends above the first fixed contact 11*a* and the first movable contact 13*a* with respect to the bottom 21*a* of the base 21. The magnet housing 25 extends above the first fixed terminal 11 with respect to the bottom 21*a* of the base 21.

The magnet housing 25 has an inlet 25*a* and an arc contact surface 25*b*. The inlet 25*a* is disposed at the lower end of the magnet housing 25 and opens downward. The inlet 25*a* is disposed above the bottom 21*a* of the base 21. The inlet 25*a* overlaps with the through hole 23*a* when viewed from the up-down direction. The arc contact surface 25*b* extends in a direction orthogonal to the left-right direction. The arc contact surface 25*b* is contacted by an arc generated between the first fixed contact 11*a* and the first movable contact 13*a*.

The magnet housing 26 having a symmetrical shape with the magnet housing 25 will be briefly described. The magnet housing 26 is disposed to the left of the second fixed contact 12*a* and the second movable contact 13*b*. The magnet housing 26 is disposed between the accommodation space 24 and the gas inflow space 28. The magnet housing 26 partitions the accommodation space 24 and the gas inflow space 28 in the left-right direction. The magnet housing 25 has an inlet 26*a* and an arc contact surface 26*b*.

The gas inflow spaces 27 and 28 are disposed between the base 21 and the cover 22. The gas inflow spaces 27 and 28 are separate from the accommodation spaces 24. The gas inflow spaces 27 and 28 are, at the upper part, in communication with the space 30 in which the drive device 4 is installed.

The gas inflow space 27 is disposed to the right of the accommodation space 24. The gas inflow space 27 is disposed between the magnet housing 25 and the outer wall 21*e* of the base 21 in the left-right direction.

The gas inflow space 28 is disposed to the left of the accommodation space 24. The gas inflow space 28 is disposed between the magnet housing 26 and the outer wall 21*d* of the base 21 in the left-right direction.

The electromagnetic relay 1 includes magnets 50 and 51, support members 60 and 61, and gas flow paths 70 and 71. The magnets 50 and 51 are, for example, rectangular permanent magnets. The magnet 50 is disposed between the accommodation space 24 and the gas inflow space 27. The magnet 50 is disposed to the right of the first fixed contact 11*a* and the first movable contact 13*a*. The magnet 50 is housed in a magnet housing 25. The magnet 50 is inserted into the magnet housing 25 from below. The magnet 50 is inserted into the magnet housing 25 through the through hole 23*a* of the side wall 23 and the inlet 25*a* of the magnet housing 25. The magnet 50 is fixedly press-fitted to the magnet housing 25. The magnet 50 is connected to a yoke 53 that is disposed to the right of the magnet 50 within the magnet housing 25. The outer surface of the magnet 50 is covered with the magnet housing 25 and a support member 60.

The magnet 50 is disposed so that the magnetic flux in the vicinity of the first fixed contact 11*a* flows to the right. The magnet 50 extends downward an arc A1 generated between the first fixed contact 11*a* and the first movable contact 13*a*. Specifically, for example, when a current flows from the first movable contact 13*a* toward the first fixed contact 11*a*, a downward Lorentz force acts on the arc A1, and the arc A1 is extended downward. As shown in FIG. 4, as extended downward, the arc A1 is extended in a direction to approach the arc contact surface 25*b*.

The magnet 51 is disposed between the accommodation space 24 and the gas inflow space 28. The magnet 51 is disposed to the left of the second fixed contact 12*a* and the second movable contact 13*b*. The magnet 51 is housed in a magnet housing 26. The magnet 51 is inserted into the magnet housing 26 through the through hole 23*b* of the side wall 23 and the inlet 26*a* of the magnet housing 26. The magnet 50 is connected to a yoke 54 that is disposed to the left of the magnet 51 in the magnet housing 26.

The magnet 51 is disposed so that the magnetic flux in the vicinity of the second fixed contact 12*a* flows to the right. The magnet 51 is disposed to face the magnet 50 at the different poles each other. The magnet 51 extends upward an arc A2 generated between the second fixed contact 12*a* and the second movable contact 13*b*. Specifically, for example, when a current flows from the second fixed contact 12*a* toward the second movable contact 13*b*, an upward Lorentz force acts on the arc A2, and the arc A2 is extended upward. As shown in FIG. 4, as extended upward, the arc A2 is extended in a direction to approach the arc contact surface 26*b*.

The support member 60 is a separate body from the base 21. The support member 60 is, for example, fixedly press-fitted to the bottom 21*a* of the base 21. The support member 60 supports the magnet 50 from below. The support member 60 aligns the magnet 50 in the up-down direction. The support member 60 retains the magnet 50 within the magnet housing 25.

The support member 60 includes a first cover portion 60*a*, a second cover portion 60*b*, a pair of coupling portions 60*c*, and a through hole 60*d*.

The first cover portion 60*a* closes the inlet 25*a* of the magnet housing 25. The second cover portion 60*b* is disposed below and separated from the first cover portion 60*a*. The second cover portion 60*b* closes the through hole 23*a* of the side wall 23. The pair of coupling portions 60*c* couples the first cover portion 60*a* and the second cover portion 60*b*. The pair of coupling portions 60*c* extend in a direction orthogonal to the front-back direction. The coupling portions 60*c* extend from both ends of the first cover portion 60*a* in the front-back direction toward the second cover portion 60*b*. The through hole 60*d* is a hole penetrating in the left-right direction and is disposed between the first cover portion 60*a* and the second cover portion 60*b* in the up-down direction. The through hole 60*d* is disposed inside the coupling portions 60*c*.

The support member 61 supports the magnet 51 from below. The support member 61 includes a first cover portion 61*a*, a second cover portion 61*b*, a pair of couplings 61*c*, and a through hole 61*d*. Since the support member 61 has a similar configuration to that the support member 60, detailed description thereof will be omitted.

The gas flow path 70 is disposed between the side wall 23 of the case 2 and the magnet 50. The gas flow path 70 extends in the left-right direction and communicates the accommodation space 24 with the gas inflow space 27. The gas flow path 70 overlaps with the magnet 50 when viewed from the up-down direction. The gas flow path 70 is disposed below the magnet 50. The gas flow path 70 resides in the support member 60. The gas flow path 70 is disposed between the first cover portion 60*a* and the second cover portion 60*b* of the support member 60. In the present embodiment, the gas flow path 70 is configured by a through hole 70*a* and the through hole 60*d* of the support member 60. The through hole 70*a* penetrates in the left-right direction between the magnet housing 25 and the side wall 23. The through hole 70*a* is formed so as to be continuous to the through hole 60*d* of the support member 60 in the left-right direction.

The gas flow path 71 is disposed between the side wall 23 of the case 2 and the magnet 51. The gas flow path 71 extends in the left-right direction and communicates the accommodation space 24 with the gas inflow space 28. The gas flow path 71 overlaps with the magnet 51 when viewed from the up-down direction. The gas flow path 71 is disposed below the magnet 51. The gas flow path 71 resides in the support member 61. In the present embodiment, the gas flow path 71 is configured by a through hole 71*a* and the through hole 61*d* of the support member 61. The through hole 71*a* penetrates in the left-right direction between the magnet housing 26 and the side wall 23. The through hole 71*a* is disposed so as to be continuous to the through hole 61*d* of the support member 61 in the left-right direction.

In the above-mentioned electromagnetic relay 1, the gas flow path 70 communicating the accommodation space 24 with the gas inflow space 27 is disposed between the side wall 23 of the case 2 and the magnet 50, enabling the hot gas due to the arc A1 to escape from the accommodation space 24 to the gas inflow space 27. In addition, the magnet 50 is disposed between the accommodation space 24 and the gas inflow space 27, and thereby the gas inflow space 27 is disposed behind the magnet 50. Thus, the hot gas is unlikely to return from the gas inflow space 27 to the vicinity of the contact. Accordingly, the possibility can be reduced that the arc A1 generated between the first fixed contact 11*a* and the first movable contact 13*a* is re-ignited.

Further, since the arc A1 is extended in the direction toward the gas flow path 70, the hot gas can be quickly released from the accommodation space 24 to the gas inflow space 27.

Since the magnet 50 is covered with the magnet housing 25 and the first cover portion 60*a* of the support member 61, the effects of the arc A1 on the magnet 50 can be reduced.

The magnet housing 25 partitions the accommodation space 24 and the gas inflow space 27, and extends upward from the first fixed contact 11*a* with respect to the side wall 23 of the case 2, which makes the hot gas more unlikely to return from the gas inflow space 27 to the vicinity of the contact. In addition, since the gas inflow space 27 is in communication with the space 30 where the drive device 4 is installed, which makes the hot gas more unlikely to return from the gas inflow space 27 to the vicinity of the contact.

It should be noted that, for example, when a current flows from the second movable contact 13*b* toward the second fixed contact 12*a*, the arc A2 is extended downward, and the gas flow path 71 enables the hot gas due to the arc A2 to escape from the accommodation space 24 to gas inflow space 27.

One embodiment of the present invention has been described above, but the present invention is not limited to the above embodiment, and various modifications can be made without departing from the gist of the invention.

The configurations of the contact device 3 and the drive device 4 may be modified. For example, the first external connecting portion 11*b* of the first fixed terminal 11 may protrude from the outer wall 21*e* of the base 21. The drive device 4 may have a plunger-type structure.

Figure 5:
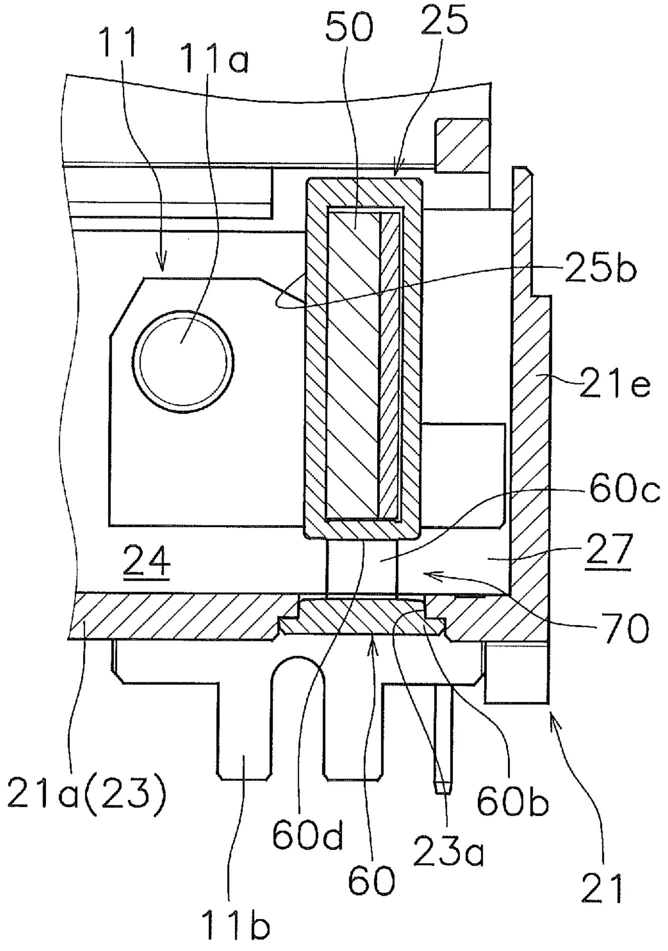
FIG. 5 is a cross-sectional view of the periphery of a magnet housing according to a modified example.

In the above embodiment, the magnet housing 25 is integrated with the base 21, but as shown in FIG. 5, the magnet housing 25 may be a separate body from the base 21. That is, the magnet housing 25 may be a separate body from the side wall 23. In addition, the magnet housing 25 and the support member 60 may be integrally formed of a material different from that of the base 21. For example, the magnet housing 25 and the support member 60 may be integrally formed of a material having better arc extinguishing performance than that of the base 21.

REFERENCE NUMERALS

1 Electromagnetic relay
2 Case
4 Drive device
11 First fixed terminal
11*a* First fixed contact
12 Second fixed terminal
12*a* Second fixed contact
23 Side wall
24 Accommodation space
25 Magnet housing
25*b* Arc contact surface
27 Gas inflow space
50 Magnet
60 Support member
70 Gas flow path

The invention claimed is:

1. An electromagnetic relay, comprising:

a first fixed terminal including a first fixed contact;

a second fixed terminal disposed apart from the first fixed terminal, the second fixed terminal including a second fixed contact;

a movable contact piece including a first movable contact facing the first fixed contact and a second movable contact facing the second fixed contact;

a case including an accommodation space, a gas inflow space separate from the accommodation space, and a side wall, the accommodation space accommodating the first fixed contact, the second fixed contact, and the movable contact piece, the side wall covering the accommodation space and the gas inflow space in a first direction;

a magnet disposed between the accommodation space and the gas inflow space, the magnet being configured to extend an arc generated between the first fixed contact and the first movable contact; and a gas flow path disposed between the side wall of the case and the magnet, the gas flow path being configured to communicate the accommodation space with the gas inflow space.

2. The electromagnetic relay according to claim 1, wherein the magnet extends the arc in the first direction.

3. The electromagnetic relay according to claim 2, wherein the case further includes a magnet housing disposed apart from the side wall in a second direction opposite to the first direction, and the gas flow path is disposed between the side wall of the case and the magnet housing.

4. The electromagnetic relay according to claim 3, further comprising a support member configured to support the magnet, wherein the gas flow path is disposed in the support member.

5. The electromagnetic relay according to claim 4, wherein the magnet housing is a separate body from the side wall of the case, the magnet housing having an arc contact surface where the arc contacts.

6. The electromagnetic relay according to claim 5, wherein the magnet housing is integrated with the support member.

7. The electromagnetic relay according to claim 4, wherein the magnet is inserted into the magnet housing in the first direction.

8. The electromagnetic relay according to claim 7, wherein the magnet housing includes an inlet opened in the first direction, the side wall of the case includes a through hole penetrating the side wall in the first direction, the magnet is housed in the magnet housing via the inlet and the through hole, the support member includes a first cover portion configured to cover the inlet and a second cover portion configured to cover the through hole, and the gas flow path is disposed between the first cover portion and the second cover portion.

9. The electromagnetic relay according to claim 3, wherein the magnet housing partitions the accommodation space from the gas inflow space.

10. The electromagnetic relay according to claim 3, wherein the magnet housing extends in the second direction beyond the first fixed contact with respect to the side wall of the case.

11. The electromagnetic relay according to claim 1, further comprising:

a drive device including a coil configured to move the movable contact piece, wherein the gas inflow space is in communication with a space where the drive device is installed.

* * * * *